United States Patent

[15] 3,673,347
[45] June 27, 1972

Schoenmakers

[54] HIGH-FREQUENCY RECORDINGS DEVICE

[72] Inventor: Johannes Joseph Martinus Schoenmakers, Emmasingel, Eindhoven, Netherlands

[73] Assignee: U.S. Philips Corporation, New York, N.Y.

[22] Filed: June 23, 1970

[21] Appl. No.: 49,129

[30] Foreign Application Priority Data

June 27, 1969 Netherlands..........................6909886

[52] U.S. Cl. ................................179/100.2 T, 179/100.2 Z
[51] Int. Cl.....................G11b 5/52, G11b 5/54, G11b 23/12
[58] Field of Search.............................179/100.2 T, 100.2 Z

[56] References Cited

UNITED STATES PATENTS 2,968,701 1/1961 Fay.................................179/100.2 T
2,856,463 10/1958 Lyon...............................179/100.2 T
3,510,605 5/1970 Ottens.............................179/100.2 T

FOREIGN PATENTS OR APPLICATIONS 919,436 2/1963 Great Britain..................179/100.2 T

*Primary Examiner*—J. Russell Goudeau
*Attorney*—Frank R. Trifari

[57] ABSTRACT

An apparatus for recording and/or reproducing video signals on or from a magnetic tape which is helically wound around a cylindrical drum. The drum comprises two axially aligned drum parts which are separated by a gap in which at least one magnetic head rotates during operation. The magnetic head is arranged on an arm which is pivotably mounted on a rotatable disc and which is in a retracted position when the disc is stationary and pivots outwards under the influence of the centrifugal forces when the disc is rotating. The magnetic head is positioned with respect to the tape by means of abutment faces which are provided on the inner surfaces of the drum parts adjacent the gap and cooperate with the pivoting arm. Drum parts and magnetic tape are preferably accommodated in a cassette which is placed on an apparatus which includes the head disc.

8 Claims, 4 Drawing Figures

Figure 1:
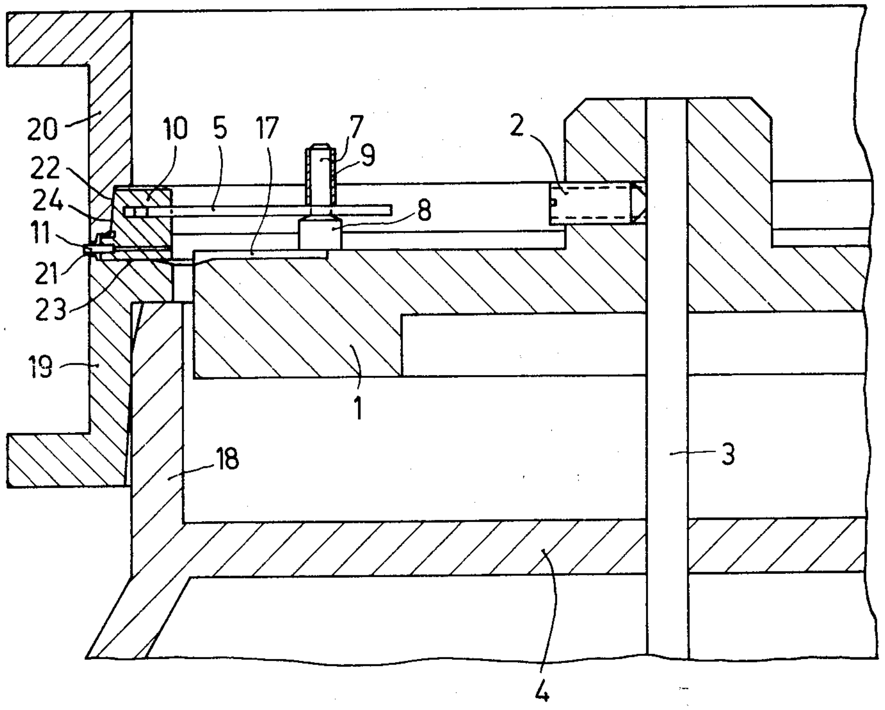

INVENTOR.
J. J. M. SCHOENMAKERS
BY
AGENT

INVENTOR.
J. J. M. SCHOENMAKERS
BY
Frank R. Trifari
AGENT

INVENTOR.
J. J. M. SCHOENMAKERS
BY
AGENT

INVENTOR.
J. J. M. SCHOENMAKERS
BY
[signature]
AGENT

HIGH-FREQUENCY RECORDINGS DEVICE

The invention relates to an apparatus for recording and/or reproducing magnetic high-frequency recordings, in particular video signals, on or from a tape-shaped record carrier. The apparatus according to the invention includes a rotatable support which is mounted on a spindle and is provided with at least one magnetic head, which, under the action of centrifugal forces produced on rotation of the support, is movable with respect to the support against spring action.

An apparatus of this type is known from German Pat. specification No. 1,165,068 (corresponding to British Pat. No. 919,436). In this known apparatus the rotatable support is provided with radial guide tracks in the shape of ribs or grooves which provide straight-line guidance for the magnetic head in the radial direction. In order to achieve accurate positioning of the magnetic head relative to the tape-shaped record carrier, the guidance for the magnetic head must be accurate with only a small amount of clearance. Such accurate straight-line guidance results in a problem because of dirt or dust lodging between the magnetic head and the guide in that the magnetic head is impeded in its movement and may even jam. Since lubrication is undesirable in view of its effect on the record carrier, dry friction occurs, the resulting frictional forces adversely affecting the positioning of the magnetic head.

It is an object of the present invention to avoid such disadvantages, and is accomplished by providing a magnetic head arranged on an arm which is pivotably mounted on the support for movement in a plane at right angles to the axis of rotation of the support.

Because pivotal movement of the arm carrying the magnetic head produces only very slight frictional forces and because the arm mount may be lubricated, more accurate positioning of the magnetic head can be achieved. Further, dust and dirt will not impede the pivotable arm carrying the magnetic head.

One embodiment of the invention provides means which ensure radial and axial positioning of the outwardly pivoting arm. This results in the advantage that the mounting and design of the arm, with respect to certain requirements such as torsional and bending rigidity, need not meet demanding requirements, and therefore the apparatus can be more cheaply manufactured.

The present invention is used in an apparatus in which the record carrier is guided in a helical loop around a cylindrical drum within which the supporting element is concentrically rotatable. The drum has a continuous gap which divides it in two parts. The movable magnetic head is brought into contact with the record carrier through the gap. According to the invention, an inner wall portion of at least one of the drum parts, which portion is adjacent the gap, forms an abutment face for the pivotable arm which limits the radial outward movement of the arm. One of the drum parts is provided with a bearing surface adjacent the gap which forms an abutment face for the outwardly pivoted arm in the axial direction. Means are also provided to cause the arm to abut the said bearing surface. Such an embodiment has the advantage that the means for axial and radial positioning of the arm with the magnetic head are located as close as possible to a tape which is wound around the drum and with respect to which the head is to be positioned.

Preferably, an inclined wall portion of one of the drum parts forms the abutment face, and the other drum part includes the bearing surface which serves as the axial abutment. When the pivotable arm engages the inclined drum wall portion an axial component of the centrifugal force thrusts the arm into engagement with the bearing surface. Proper axial positioning is thereby automatically insured during the radial positioning of the arm without the use of additional auxiliary means. The pivotable arm preferably has abutment means in the form of at least one inclined end face portion of the arm, the slope of which is substantially equal to that of the inclined drum wall portion.

According to the invention, in order to reduce frictional effects in the arm mounting, a V-groove mounting which is formed by a triangular aperture in one of the said two portions, is provided on the support. The aperture receives a pin of circular cross-section which is secured to the other portion.

The invention may also include means for damping the pivotal movement of the arm relative to the support. This prevents the spring-biassed arm from vibrating which might adversely affect the contact between the head and the record tape. According to the invention, the damping means is provided by a leaf spring which is secured to a pivotable lever mounted on the pivot of the arm and exerts a pressure on the arm in a direction substantially at right angles to the direction of movement of the arm. An abutment is arranged on the support for the lever which, before the arm reaches its maximum displacement, stops the movement of the lever due to the centrifugal forces. To achieve an additional damping effect butyl rubber may be interposed between the leaf spring and the pivotable arm.

The invention also relates to a cassette suitable for use in an apparatus according to the invention. Such a cassette comprises at least one tape-shaped record carrier and two co-axially arranged drum parts which are separated by a gap and around which the tape is helically wound. One of the drum parts is internally provided with an inclined wall portion adjacent the gap and the other drum part has a bearing edge situated in a plane at right angles to the common axis of the two drum parts.

Figure 2:
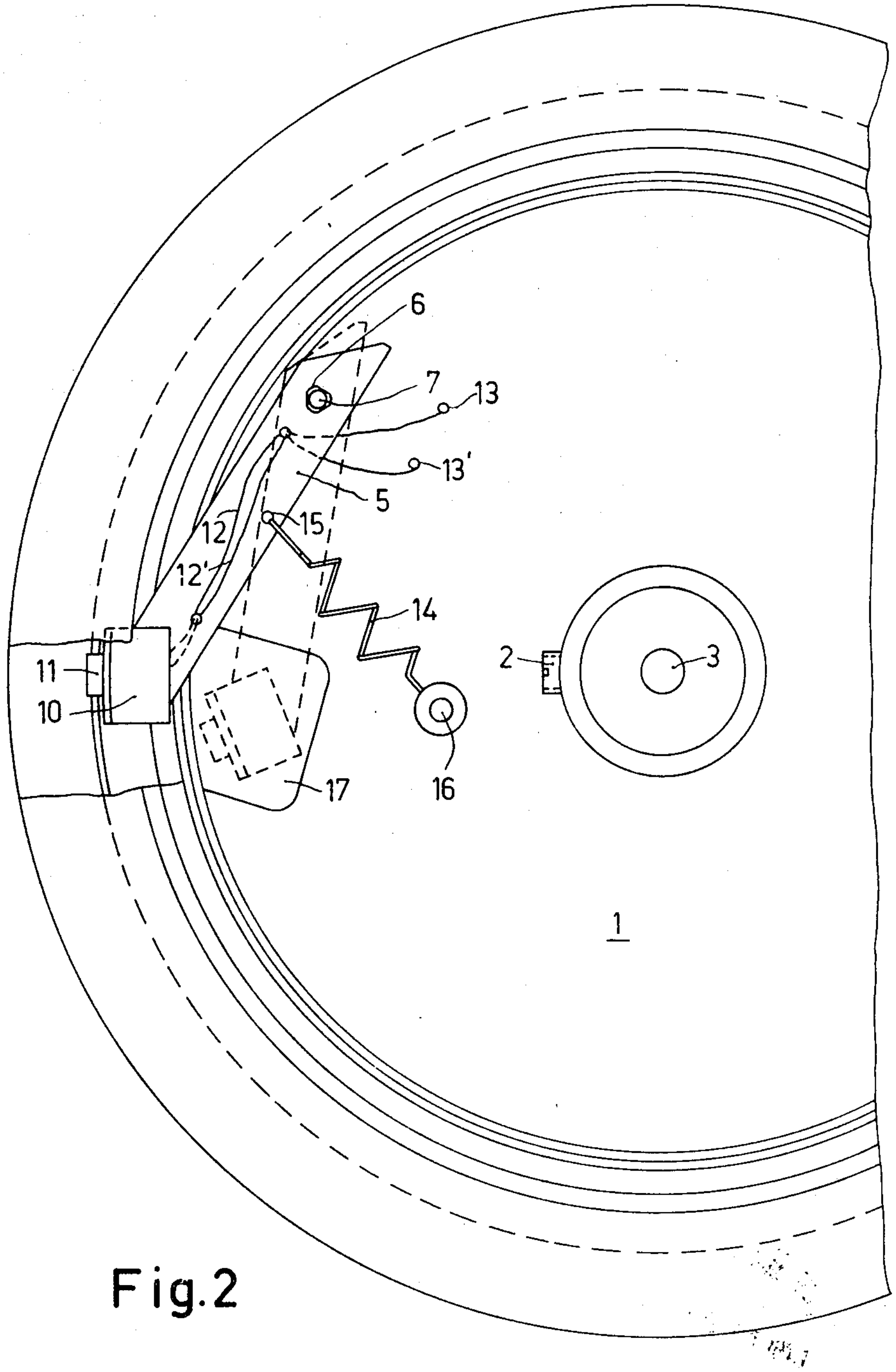
Figure 3:
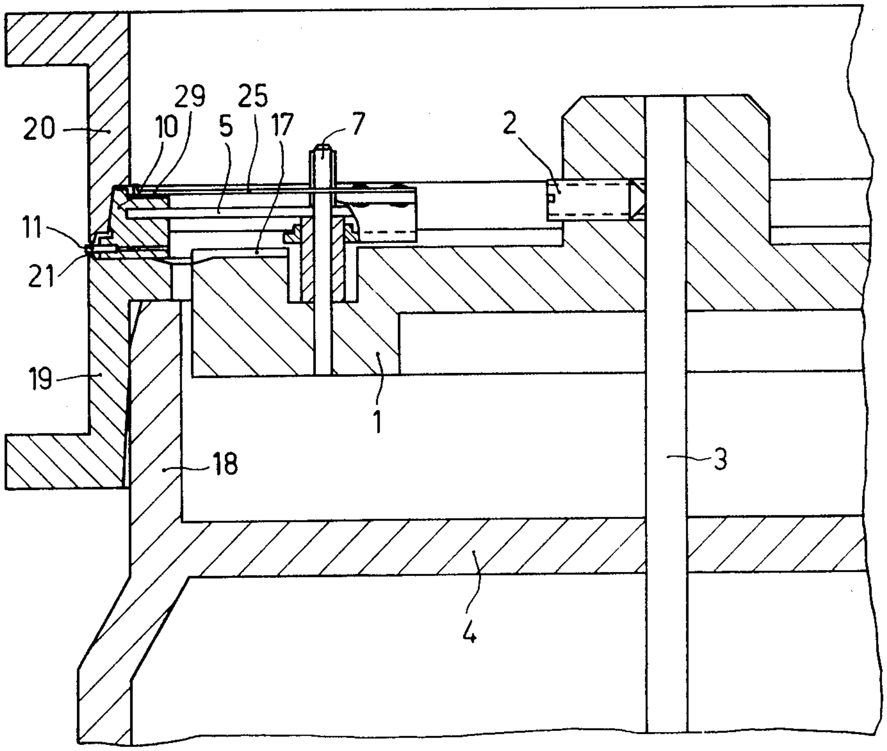
Figure 4:
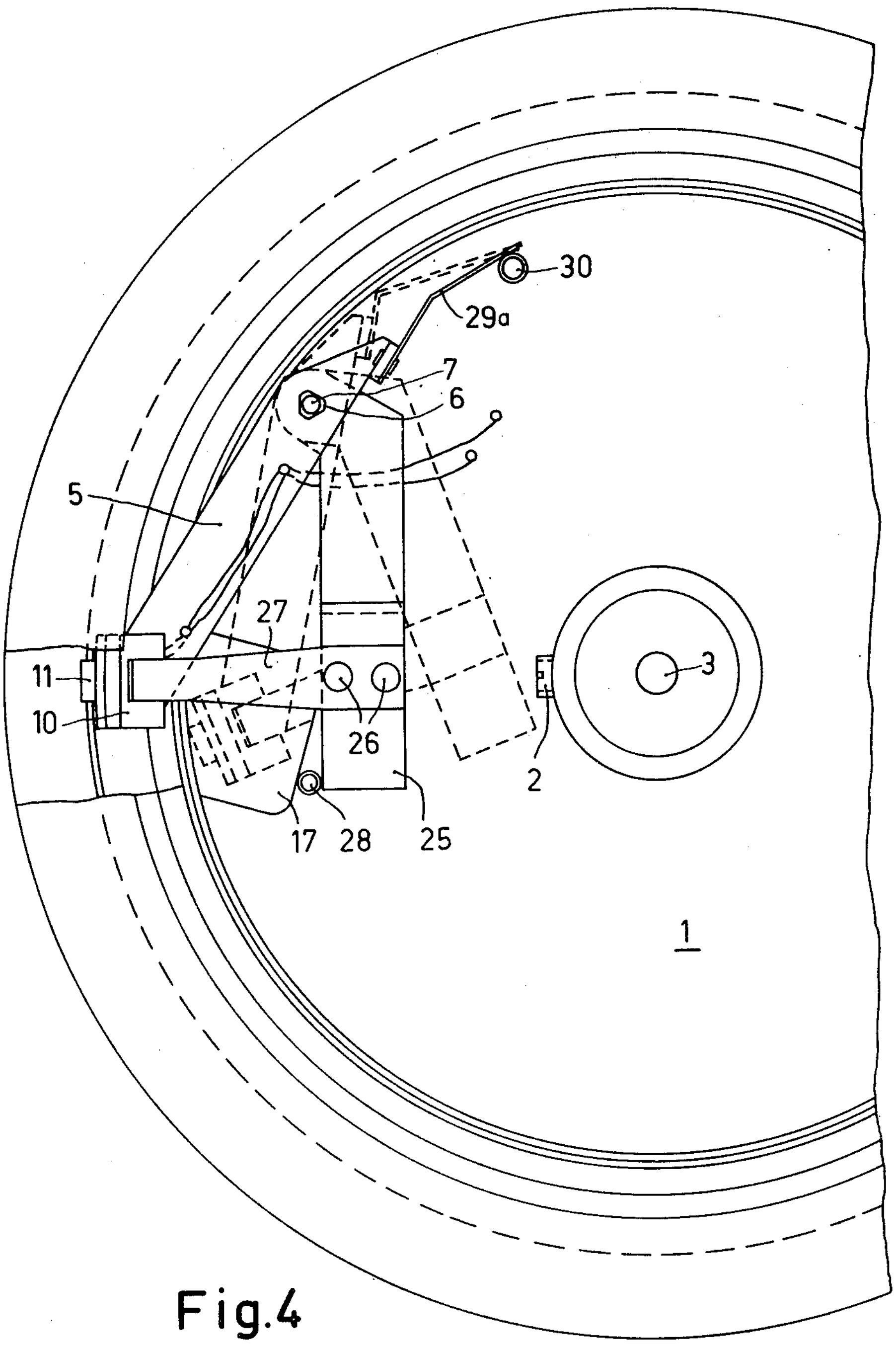

Embodiments of the invention will now be described, by way of example, with reference to the accompanying diagrammatic drawings, in which:

FIG. 1 is a longitudinal sectional view of part of a magnetic-head disc and tape guide drum according to the invention, FIG. 2 is a top-plan view of the parts of the disc and drum shown in FIG. 1, part of the drum being broken away, FIG. 3 is a longitudinal sectional view of part of a modified embodiment of a magnetic-head disc and a tape guide drum according to the invention, and FIG. 4 is a top plan view of the parts of the disc and drum shown in FIG. 3, part of the drum being broken away.

The drawing shows only those component parts of an apparatus for recording and/or reproducing magnetic high-frequency recordings, in particular video signals on and from a tape-shaped record carrier, which are considered to be essential to the present invention.

In the embodiment of an apparatus according to the invention shown in FIGS. 1 and 2, a disc 1 is rigidly mounted on a vertical spindle 3 by means of a set screw 2, which spindle is journalled in a fixed support 4 of the apparatus and can be driven by means which are not shown. On the disc 1 there is mounted an arm 5 so as to be pivotable in a plane at right angles to the spindle 3 of the disc 1. For this purpose, there has been formed in the arm 5 near one of its ends a triangular aperture 6 into which projects a pin 7 of circular cross-section which is arranged on the disc 1 so as to be parallel to the spindle 3. As FIG. 1 shows, axial displacement of the arm on the pin is prevented by the arm bearing on a collar 8 of the pin and by the provision of a sleeve 9 which surrounds the pin and may be made of a synthetic material or rubber. To the other end of the arm is secured a holder 10 which accommodates a magnetic head 11 for recording and/or reproducing magnetic recordings. In practice, it has been found of advantage to make the arm 5 and the magnetic-head holder 10 in one piece. By means of electric conductors 12 led along the arm and passing through apertures 13 and 13' in the disc 1 the magnetic head is included in an electric circuit of the apparatus in a manner known in video apparatus using rotating head discs.

The pivotal movement performed by the arm carrying the magnetic head under the influence of centrifugal forces produced on rotation of the disc 1 takes place against the action of a spring 14, one end of which is secured to the arm 5 at 15 and the other end of which is secured to the disc 1 at 16. FIG. 1 shows by broken lines the inoperative or initial position of the arm carrying the magnetic head, the disc being stationary and the holder 10 being retracted into a recess 17 in the disc by the spring 14. The operative position of the arm carrying the magnetic head, which position it will be caused to assume by the centrifugal forces on rotation of the disc, is shown in full lines. An additional contribution to the assumption of this operative position is provided by means which ensure radial and axial positioning of the outwardly pivoting arm and which will be described more fully hereinafter.

The rigid disc support 4 of the apparatus has a cylindrical flange 18 on the outer surface of which are centered two coaxially arranged drum parts 19 and 20, which are joined to one another in a manner not shown and within which the disc 1 is concentrically arranged for rotation. A tape-shaped record carrier, not shown, can be wound around the drum 19 and 20 in known manner. The drum part 19 and 20 are separated by a continuous gap 21 through which the movable magnetic head 11 can be brought into contact with the record tape.

In this embodiment the aforesaid means which ensure radial and axial positioning of the arm are constituted by an inclined wall portion 22 of the internal surface of the wall part 20 adjacent the gap 21, which portion 22 forms a radial abutment face for the pivotable arm 5, and by an annular bearing edge 23 of the other drum part 19, which edge forms an axial abutment for the arm. When the arm engages the inclined wall portion 22 the resulting axial component of the centrifugal force will thrust the arm against the bearing or supporting edge 23. The holder part 10 of the arm preferably has at least one inclined end face 24 the slope of which is substantially equal to that of the inclined drum wall portion 22 and which is capable of co-operating with this drum wall portion.

The drum parts 19 and 20 may in known manner be integral components of a video apparatus. However, the described arrangement comprising an arm magnetic-head combination capable of being retracted to a position within the internal periphery of the drum is particularly suited for use in combination with a known video-tape cassette comprising a tape wound on reels and drum parts, the drum parts being centered on the collar portion 18 of the support 4 of the apparatus when the cassette is placed in position.

In FIGS. 3 and 4, which show a modified embodiment of the invention, component parts which are identical to those of the afore described embodiments are designated by corresponding reference numerals. The embodiment shown in FIGS. 3 and 4 mainly differs from the afore-described embodiment by the provision of means which damp the pivotal movement of the arm 5 relative to the disc 1. On the pin 7 about which the arm 5 is pivotable there is mounted a second arm or lever 25 which also is movable with respect to the arm 5 in a plane at right angles to the spindle 3 of the disc 1. A leaf spring 27 is secured by suitable means 26 to the arm 25. The end of the spring most remote from the arm 25, exerts a pressure on the arm 5 in a direction substantially at right angles to the direction of movement of the arm 5. An abutment pin 28, which restricts the radial outward movement of the arm 25, is arranged on the disc 1. The location of the pin 28 on the disc 1 is chosen so that the movement of the arm 25 is stopped before the arm 5 reaches its maximum displacement.

When the disc 1 is stationary the arms 5 and 25 will be in the positions shown by broken lines in FIG. 4. When the disc starts rotating both arms move radially outwards, the arm 25 first abutting against the pin 28, whilst the arm 5 carrying the magnetic head 11 continues its outward movement until the inclined end face portion 24 (FIG. 1) of the arm 5 engages the inclined abutment wall portion 24 of the drum part 20. During this latter trajectory of the arm 5, during which the arm 25 is stopped by the pin 28, the normal force exerted on the arm 5 by the leaf spring 25 will produce a frictional force which damps any further movement of the arm 5. In this embodiment, in order to increase the damping effect a butyl rubber sheet 29 is interposed between the leaf spring 25 and the magnetic-head holder 10 of the arm 5. In the embodiment shown in FIGS. 3 and 4, the restoring spring for the arms 5 and 25 takes the form of a leaf spring 29*a* the free end of which engages an abutment pin 30 secured to the disc 1. In the inoperative position of the arms, which is shown by broken lines, the spring 29*a* is substantially relaxed. During the outward movement of the arms the spring 29*a* is gradually tensioned.

In both embodiments illustrated and described the means which ensure correct radial and axial positioning of the outwardly pivoting arm have been provided on the drum parts 19 and 20. It should, however, be noted that the invention also includes embodiments in which either the means for radial positioning or the means for axial positioning or both means are provided on the rotatable disc 1.

What is claimed is:

1. An apparatus for reproducing and/or recording magnetic high-frequency recordings, in particular video signals, on or from a tape-shaped record carrier, comprising a spindle, a support rotatably mounted on said spindle, at least one magnetic head mounted on said support, said magnetic head being arranged for movement with respect to the support as a result of centrifugal forces produced on rotation of the support, biasing means connected to said support for urging said magnetic head in a direction opposite to that urged by the centrifugal forces, an arm for carrying said magnetic head pivotably mounted on the support and arranged for pivotal movement in a plane at right angles to the axis of rotation of the support, a cylindrical drum within which the support is concentrically rotatable, said record carrier being helically wound about said drum, a continuous gap provided in said drum so as to divide it into two parts, said movable magnetic head being arranged for movement through said gap so as to be brought into contact with the record carrier, an abutment face formed by an inner wall portion of at least one drum part which is adjacent the gap, for limiting the radial outward movement of the arm, a bearing surface provided on one of the drum parts adjacent the gap which forms an abutment face for the outwardly pivoted arm in the axial direction, means for causing the outwardly pivoted arm to abut against the said bearing surface.

2. The apparatus as claimed in claim 1, wherein said radial abutment face is formed by an inclined wall portion of one of the drum parts and wherein the axial abutment is formed by the other drum part, whereby an axial component of the centrifugal force thrusts the arm into engagement with the bearing surface when the pivotable arm abuts against the inclined drum wall portion.

3. The apparatus as claimed in claim 2, further comprising abutment means formed by at least one inclined end face provided on the pivotable arm, the slope of said abutment means being substantially equal to that of the inclined drum wall portion.

4. The apparatus as claimed in claim 3 wherein the arm is mounted on the support in a V-groove mounting comprising a triangular aperture in one of the said two component parts and a pin of circular cross-section secured to the other component part and projecting into the said triangular aperture.

5. The apparatus as claimed in claim 1 further comprising means for damping the pivotal movement of the arm relative to the support.

6. The apparatus as claimed in claim 5, wherein said damping means comprises a leaf spring secured to a pivotable lever mounted on the arm and which exerts a pressure on the arm in a direction substantially at right angles to the direction of displacement of the arm, the support being provided with an abutment for the lever which stops the movement of the lever produced by the centrifugal forces before the arm reaches its maximum displacement.

7. The apparatus as claimed in claim 6, further comprising butyl rubber interposed between the leaf spring and the pivotable arm.

8. A cassette suitable for use in an apparatus as claimed in claim 1 comprising at least one tape-shaped record carrier and two co-axially arranged drum parts, which are separated by a gap and around which the record carrier is helically wound, characterized in that one of the drum parts is internally provided with an inclined wall portion adjacent the gap and the other drum part contains a bearing edge situated in a plane at right angles to the common axis of the two drum parts.

* * * * *